UNITED STATES PATENT OFFICE.

DITTMAR FINKLER, OF BONN, GERMANY.

PROCESS OF GRINDING BRAN.

972,103. Specification of Letters Patent. Patented Oct. 4, 1910.

No Drawing. Original application filed June 22, 1906, Serial No. 322,928. Divided and this application filed September 1, 1909. Serial No. 515,681.

*To all whom it may concern:*

Be it known that I, DITTMAR FINKLER, a subject of the Emperor of Germany, and resident of Bonn, Germany, have invented certain new and useful Improvements in Processes of Grinding Bran, of which the following is a specification.

My invention relates to the grinding of bran or the covering walls of cereals, legumes and other seed and vegetable substances.

I have discovered that bran contains a material proportion of nutrients which is ordinarily not available for digestion for the reason that these nutrients (albumen) are entirely inclosed in cell walls they are not attacked by the digestive juices.

The object of my invention is therefore to break these cell walls so as to expose the albumen contained therein.

The present application is a division of another application filed by me in the United States Patent Office on June 22, 1906, Ser. No. 322,928.

According to the species of my invention which forms the subject matter of the present application, I bind the particles of bran or other substances to be treated together by an agglutinative substance such as dextrin or its equivalent casein so as to form after the hardening of such agglutinant a hard-caked mass which consists of the agglutinant and of the raw and uncooked bran or other vegetable substance. This hard-caked mass I grind and as the adhesion between the agglutinant and the indigestible cell walls is stronger than the adhesion between the latter and their albumen contents, the result of the grinding operation is a breaking of the cell walls and the liberation of their nutrient contents in a raw state. The agglutinant may then be removed if desired by suitable processes, as by simply washing it out or in some cases it may be desirable to retain the agglutinant or at least a portion thereof. The exact proportion of agglutinant and bran is not of great importance. I mix the agglutinant such as dextrin with enough water to form a thick paste and then add this to the raw and uncooked bran in the proportion of about one part by weight to ten parts by weight of bran and then grind.

Bran which heretofore has been considered a product of inferior value is, by my process, rendered as valuable as ordinary good flour. In addition it furnishes more nutrients to the body and is easier digestible than the ordinary flour.

When I mention bran in this specification and in the claims, I mean the bran of cereals or the corresponding covering of legumes or other seeds and vegetable food substances.

I claim as my invention:

1. The process of increasing the digestibility of the bran of cereals, which consists in forming it into hard-caked masses by the addition to the uncooked bran of an agglutinant and then comminuting such masses the comminuting process being continued until the cell walls of the bran are broken and emptied.

2. The process of increasing the digestibility of the bran of cereals, which consists in forming it into hard-caked masses by the addition to the uncooked bran of dextrin and then comminuting such mass, the comminuting process being continued until the cell walls of the bran are broken and emptied.

In witness whereof I have hereunto set my hand in the presence of two subscribing witnesses.

DITTMAR FINKLER.

Witnesses:
WM. VANDORY,
OSCAR DEPNER.